Patented Mar. 24, 1936

2,035,437

UNITED STATES PATENT OFFICE 2,035,437

PROCESS FOR PREPARING PULVERIFORM RUBBER BY SPRAYING LATEX IN A DRYING ATMOSPHERE

Martinus Joännes Stam, The Hague, Netherlands

No Drawing. Application July 12, 1934, Serial No. 734,859. In the Netherlands April 24, 1934

7 Claims. (Cl. 18—50)

The invention relates to the preparation of pulveriform rubber by spraying latex in a drying atmosphere (the word "latex" comprises not only latex of Hevea brasiliensis, but also latices of other rubber bearing plants.)

One object of the invention is to obtain rubber in the form of an impalpable non-sticky, non-hygroscopic powder which is proof against atmospheric conditions. Another object of the invention is to obtain an impalpable non-sticky, non-hygroscopic rubber powder, which can be mixed in powder form with fillers, compounding material, vulcanizing agents, etc., and which can be readily redispersed in water to form a latex like liquid with or without compounding materials. Another object of the invention is to obtain a non-sticky, non-hygroscopic impalpable rubber powder from latex in a cheap manner by the aid of cheap agents which are easily obtainable in large quantities in all rubber growing countries.

It is known to obtain a fine rubber powder by spraying in a drying atmosphere latex to which hemoglobine has been added which acts as a protective colloid. Hemoglobine, however, is expensive. It coagulates at 65.5° C. and large quantities are required to obtain the desired effect. For obtaining an impalpable powder, which may be redispersed in water, about 15% of hemoglobine is required.

It will be clear that a method which requires the addition of such quantities of a substance which is relatively expensive and not at all available in sufficient quantity in rubber growing countries, has no chance of being used on a large scale.

These drawbacks have been overcome by the present invention which consists in mixing rubber latex with solubilized starch and a substance such as a phenol or an aldehyde capable of reacting with farina to yield a condensation product and spraying the mixture in a drying atmosphere. By this process the rubber is obtained in the form of an impalpable, non-sticky, non-hygroscopic powder. Each particle of this powder consists of pure rubber coated with a thin layer of a condensation product of farina with the added phenol, aldehyde or the like. As this coating is resistent to the influences of the atmosphere, and non-hygroscopic, the rubber particles are protected against atmospheric influences and moisture. These properties make it possible to mix the powder with compounding ingredients to a homogeneous mixture in the presence of water, in which the added substances such as accelerators may be dissolved.

The solubilized farina may be partly or wholly substituted by other solubilized or soluble carbohydrates, capable of forming a dry protective layer around every dry rubber particle obtained by the spray drying process.

The farina which may be used in rubber growing countries is available in large quantities and may be obtained cheaply out of roots and bulbs. For instance farina of cassava or arrowroot is very suitable. Particularly in rubber growing countries said kinds of farina are extremely cheap and available in large quantities. By solubilizing such farina in water it can be easily mixed with the latices and by the addition of one or more water soluble condensing agents, such as formaline, phenol, cresol, etc., the farina is resinified at the drying temperature to form an insoluble product, which is immune to atmospheric conditions.

*Example*

A portion of cassava flour (manioc meal) with an equal portion of water is introduced in a closed vessel, provided with a stirrer and having walls heated by steam. A small amount of sulphuric acid, for instance 0.01–0.1% is added. After vigorous stirring the farina dissolves and now for instance 5% of phenol is added. If now latex is mixed with about 20% of the so obtained solution and then sprayed at a temperature of about 100° C. the obtained rubber particles are coated with a layer which is immune against atmospheric conditions and non-hygroscopic.

The advantages obtained by the present invention are very important because it thereby becomes possible to store and transport rubber powder, for instance in ordinary jute bags in tropical countries, whereas the vulcanized products obtained from this powder are not more hygroscopic than those made from sheet or crêpe-rubber.

If absolute immunity from atmospheric conditions is not required, it is sufficient to mix the latex with solubilized farina only. In that case the rubber particles are coated by dried farina which is practically non-hygroscopic and though not immune against atmospheric conditions the so coated rubber particles can be used with advantage for all purposes in which not the highest quality standard is required.

What I claim is:—

1. Process for obtaining impalpable non-hygroscopic, non-sticky rubber powder, comprising the steps of adding solubilized farina and phenol to rubber bearing latex and spray drying the mixture in a heated atmosphere.

2. Process for obtaining impalpable non-hygroscopic, non-sticky rubber powder, comprising the steps of adding solubilized farina and an aldehyde to a rubber bearing latex and spray drying the mixture in a heated atmosphere.

3. Process for obtaining impalpable non-sticky, non-hygroscopic rubber powder, comprising the steps of adding about 20% solubilized farina containing about 5% phenol to rubber latex and spray drying the mixture in a heated atmosphere.

4. Process for obtaining impalpable non-sticky, non-hygroscopic rubber powder, comprising the steps of adding solubilized farina and formaldehyde to rubber latex and spray drying the mixture in a heated atmosphere.

5. Pulveriform rubber, consisting of an impalpable powder of rubber particles coated by a condensation product of a carbohydrate and a phenol.

6. Process for obtaining impalpable, non-sticky, non-hygroscopic rubber powder, comprising stirring cassava flour with equal volume of water in a closed heated chamber, adding thereto between 0.01% to 0.1% of sulphuric acid thereby dissolving said powder, then adding to the mixture about 5% phenol, finally mixing about 20% of the resultant solution with latex and spraying the resultant mixture in a hot drying atmosphere, thus producing coated rubber particles which are non-hygroscopic and immune against atmospheric conditions.

7. Process for obtaining non-hygroscopic, non-sticky impalpable rubber powder, comprising the steps of adding solubilized farina and a substance of the group consisting of phenols and aldehydes, capable of forming a non-hygroscopic condensation product with said farina, to a rubber bearing latex and spray drying the mixture in a heated atmosphere.

MARTINUS JOÄNNES STAM.